US012700651B2

(12) United States Patent
Li et al.

(10) Patent No.: US 12,700,651 B2
(45) Date of Patent: Aug. 4, 2026

(54) BATTERY

(71) Applicant: Techtronic Cordless GP, Anderson, SC (US)

(72) Inventors: Kun Li, Anderson, SC (US); Denis Gaston Fauteux, Anderson, SC (US); Xiqing Wang, Anderson, SC (US); Na Wang, Anderson, SC (US); Xiaopeng Yuan, Anderson, SC (US); Changjian Lu, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 646 days.

(21) Appl. No.: 18/154,992

(22) Filed: Jan. 16, 2023

(65) Prior Publication Data

US 2023/0231291 A1     Jul. 20, 2023

(30) Foreign Application Priority Data

Jan. 19, 2022     (CN) .......................... 202210062284.1

(51) Int. Cl.
*H01M 50/583*          (2021.01)
*H01M 10/0525*        (2010.01)
(Continued)

(52) U.S. Cl.
CPC ..... *H01M 50/583* (2021.01); *H01M 10/0525* (2013.01); *H01M 10/0587* (2013.01); *H01M 50/571* (2021.01); *H01M 50/578* (2021.01)

(58) Field of Classification Search
CPC .......... H01M 50/583; H01M 10/0525; H01M 10/0587; H01M 50/571; H01M 50/578;
(Continued)

(56) References Cited

U.S. PATENT DOCUMENTS

2018/0159109 A1      6/2018  Tsubouchi et al.
2020/0127337 A1*    4/2020  Kim .................. H01M 10/4235
2021/0167474 A1*    6/2021  Kim .................... H01M 50/536

FOREIGN PATENT DOCUMENTS

EP          1710858 A1 * 10/2006  .......... H01M 50/143
EP          3544085 A1    9/2019

OTHER PUBLICATIONS

Extended European Search Report for Application No. 23152391.1 dated Jun. 16, 2023 (6 pages).

* cited by examiner

*Primary Examiner* — Daniel S Gatewood
(74) *Attorney, Agent, or Firm* — Michael Best & Friedrich LLP

(57)          ABSTRACT

The present invention provides a battery, comprising a case, a cell packaged in the case, an electrical terminal located at one end of the case and electrically connected to the cell, a safety device and a current cut-off device. The safety device comprises a first and second electrode respectively electrically connected to a positive electrode or a negative electrode. The first electrode and the second electrode are arranged spaced apart from each other and form an electric field, and a gas generating material capable of generating an inert gas when a voltage reaches or exceeds a threshold value is provided in the electric field. The current cut-off device is electrically connected between the cell and the electrical terminal and is capable of causing a brake of circuit in response to a pressure difference between the inside and the outside of the battery caused by the inert gas.

10 Claims, 5 Drawing Sheets

(51) Int. Cl.
    *H01M 10/0587*    (2010.01)
    *H01M 50/571*    (2021.01)
    *H01M 50/578*    (2021.01)

(58) Field of Classification Search
    CPC ............. H01M 50/581; H01M 10/052; H01M 2200/20; H01M 50/572; H01M 10/058; H01M 10/44; H01M 50/10; H01M 50/172; H01M 50/502; Y02E 60/10; Y02P 70/50
    See application file for complete search history.

BATTERY

CROSS-REFERENCE TO RELATED APPLICATIONS

This application claims priority pursuant to 35 U.S.C. 119 to Chinese Application No. 202210062284.1, filed Jan. 19, 2022, which application is incorporated herein by reference in its entirety.

TECHNICAL FIELD

The present invention relates to a battery, and in particular, to a lithium-ion battery having a safety device, which can improve the overcharge safety performance.

BACKGROUND ART

In recent years, rechargeable batteries have been used in a wide range of applications, from electronic products to new energy vehicles. Lithium-ion batteries are particularly popular with users due to their high energy density and long service life. During charging, the temperature of the battery will rise. In the case of poor heat dissipation, there is a temperature imbalance inside the battery. The closer to the centre, the higher the temperature. Especially when overcharging occurs, the voltage of the battery exceeds the allowable voltage value, making the temperature imbalance more prominent, and leading to safety hazards such as burning and explosion of the battery.

Taking a lithium-ion battery as an example, the current solution to battery overcharging is to provide a current cut-off device therein and to dope an additive such as lithium carbonate in electrode plates of the lithium-ion battery. When an internal pressure or temperature of the lithium-ion battery rises to a safety threshold value, the lithium carbonate is decomposed to generate gas, increasing the internal gas pressure of the lithium-ion battery. The current cut-off device is structurally broken under the high gas pressure to form a break of circuit in the lithium-ion battery, thereby preventing the temperature from continuing to rise and providing protection. However, the lithium carbonate itself is not conductive and, when being doped in the electrode plates, will have a negative impact on the energy density and the internal resistance of the battery, and there is a risk of introducing metal foreign bodies. In addition, as the lithium carbonate is dispersed in the electrode plates and has a high melting point, it is difficult to respond to overcharging and overheating of the lithium-ion battery in a timely manner, resulting in low operation efficiency.

Therefore, there is a need to provide a battery to at least partially solve the above problems.

SUMMARY OF THE INVENTION

An objective of the present invention is to provide a battery, which can eliminate safety hazards in overcharging or overheating and reduce negative impacts on current lithium-ion batteries such as reduced energy density, increased internal resistance, low operation efficiency, and the risk of introducing metallic foreign bodies caused by the doping of lithium carbonate.

According to an aspect of the present invention, the battery comprises:

a case;

a cell packaged in the case;

an electrical terminal located at one end of the case and electrically connected to the cell;

a safety device comprising:

a first electrode, wherein the first electrode is electrically connected to one of a positive electrode and a negative electrode of the cell;

a second electrode, wherein the second electrode is electrically connected to the other one of the positive electrode and the negative electrode, the first electrode and the second electrode are arranged spaced apart from each other, and an electric field is formed between the first electrode and the second electrode; and a gas generating material, wherein the gas generating material is provided in the electric field and capable of generating an inert gas when a voltage in the electric field reaches or exceeds a predetermined threshold value; and a current cut-off device electrically connected between the cell and the electrical terminal and capable of causing a brake of circuit in response to a pressure difference between the inside of the battery and an external environment caused by the inert gas generated by the safety device.

In some embodiments, the battery is a lithium-ion battery, the cell is composed of a positive electrode plate, a separator and a negative electrode plate that are stacked and wound, and has an internal winding cavity, and the safety device is configured to have an elongated shape and arranged in the winding cavity.

In some embodiments, one of the first electrode and the second electrode is configured as a cylinder in which the gas generating material is filled, and the other one is configured as a needle-like structure which extends at least partially into the cylinder in an axial direction of the cylinder and is buried in the gas generating material. Preferably, the positive electrode plate is not doped with lithium carbonate.

In some embodiments, the gas generating material is doped with conductive particles, and at least a part of the needle-like structure that is in contact with the gas generating material is provided with an insulating layer.

In some embodiments, the conductive particles are carbon black.

In some embodiments, the cylinder is provided with at least one opening through which an internal space of the cylinder is capable of communicating with the winding cavity.

In some embodiments, at least one of the at least one opening is provided at an end portion of the cylinder that faces towards the needle-like structure.

In some embodiments, the first electrode and the second electrode are made of a corrosion-resistant metal material, and preferably of stainless steel.

In some embodiments, the gas generating material comprises particles of an inorganic material that have a micron-order size, the inorganic material preferably comprises lithium carbonate, and the size is preferably 10 µm to 20 µm.

In some embodiments, the gas generating material has a mass of 10 mg to 200 mg.

The battery of the present invention can achieve the following technical effects.

As an overcharge additive is concentrated in the safety device, the amount of overcharge additive that reacts when the battery is overcharged can be increased, the gas generation rate can be increased, and the gas may escape directly into an internal space of the battery, thereby saving time for migration from the cell and increasing the reaction rate.

As there is no need to disperse the overcharge additive in the electrode plates of the cell by means of doping, the energy density and the power density of electrode plates are increased, while the risk of introducing metallic foreign bodies can be reduced, with less negative impact on the design and the electrochemical performance of the cell.

BRIEF DESCRIPTION OF THE DRAWINGS

For a better understanding of the above and other objectives, features, advantages and functions of the present invention, reference may be made to the preferred embodiments shown in the accompanying drawings. In the accompanying drawings, the same reference numerals refer to the same components. It should be understood by those skilled in the art that the accompanying drawings are intended to illustrate schematically preferred embodiments of the present invention and do not impose any limitation to the scope of the present invention, and that the individual components in the figures are not drawn to scale.

LIST OF REFERENCE SIGNS

Figure 1:
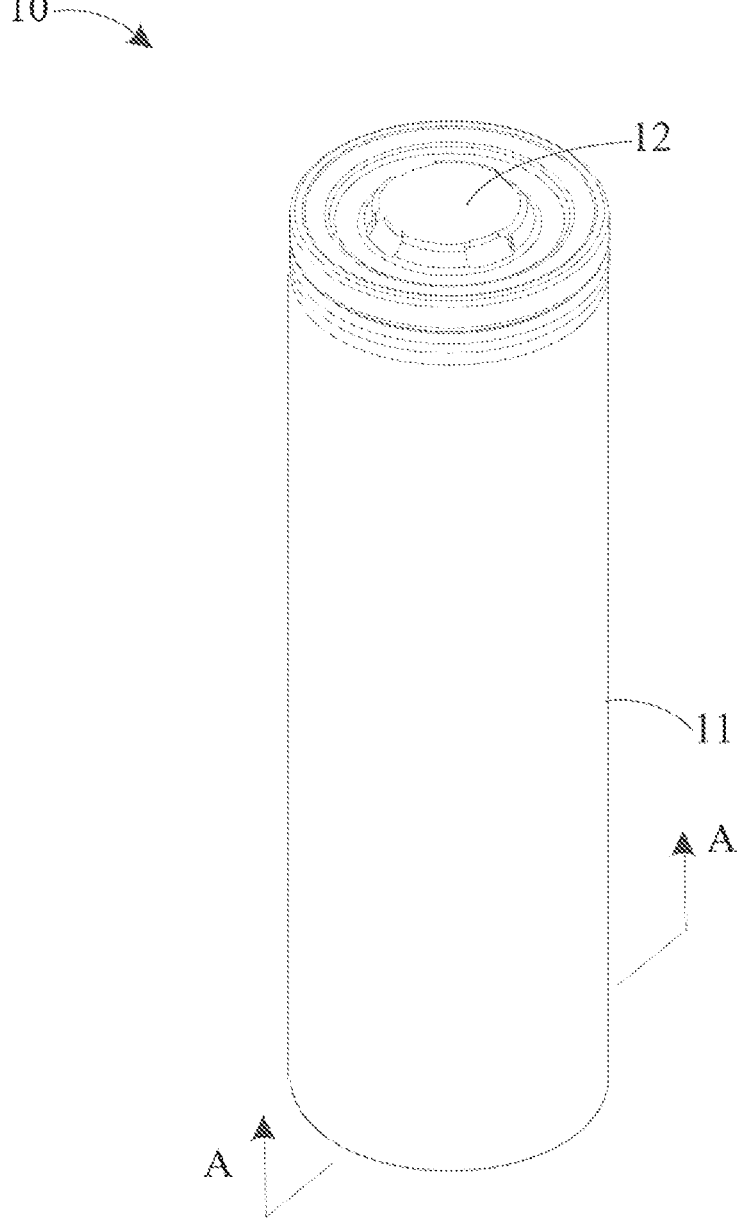
FIG. 1 is a perspective view of a battery according to a preferred embodiment of the present invention.

10 Battery
11 Case
12 Electrical terminal
13 Cell
131 Positive electrode plate
132 Negative electrode plate
133 Separator
134 Winding cavity
14 Insulating layer
15 Positive electrode current collector
16 Current cut-off device
17 Safety device
171 First electrode
172 Gas generating material
173 Second electrode
174 Insulating layer
18 Negative electrode current collector

DETAILED DESCRIPTION OF THE EMBODIMENTS

Specific embodiments of the present invention are now described in detail with reference to the accompanying drawings. Only preferred embodiments according to the present invention are described here, and those skilled in the art would conceive of other ways of implementation of the present invention on the basis of the preferred embodiments, which also fall within the scope of the present invention.

Figure 2:
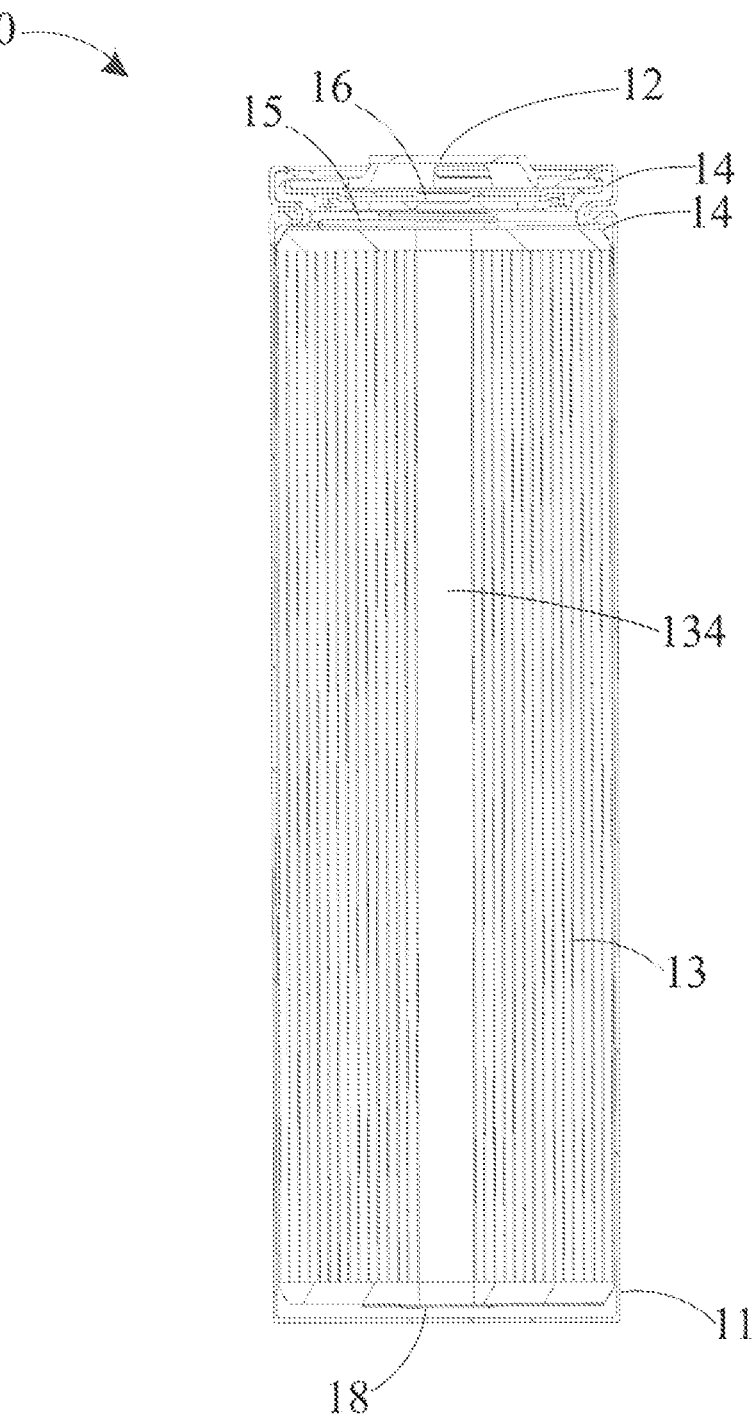
FIG. 2 is a sectional view taken along line A-A in FIG. 1, where a safety device is omitted.
Figure 3:
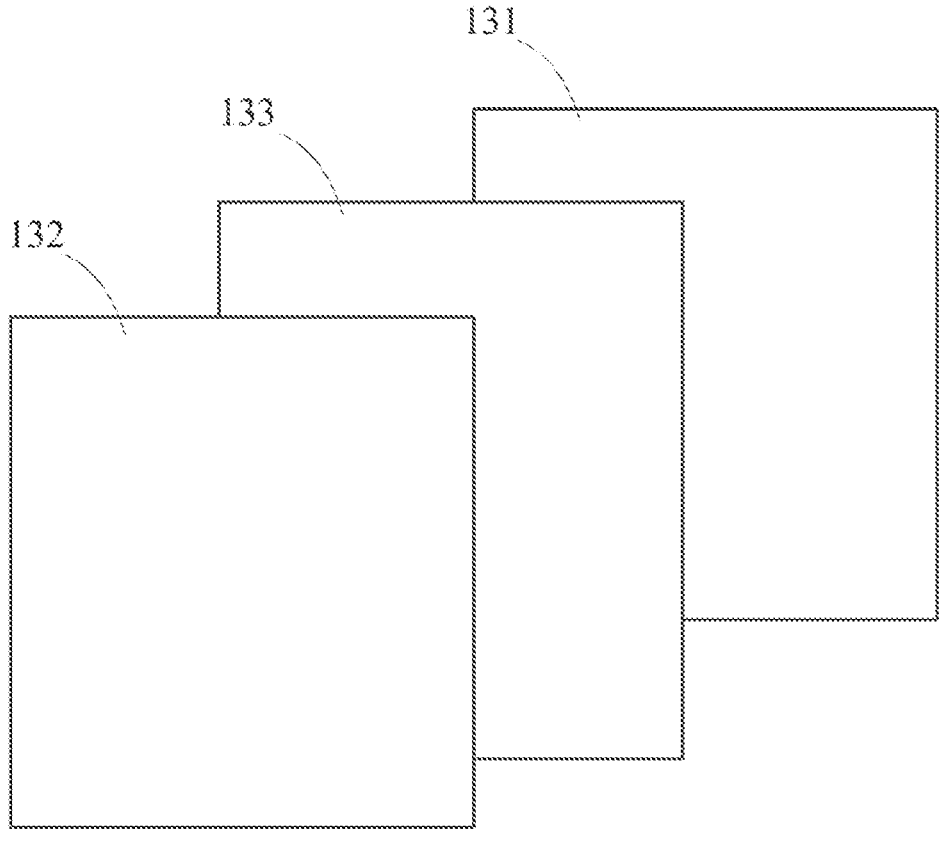
FIG. 3 is a schematic diagram of stacked layers of a cell of the battery shown in FIG. 1 before winding.

The present invention provides a battery. In a preferred embodiment, the battery may be a lithium-ion battery. As shown in FIGS. 1 and 2, the battery 10 is configured to have a generally cylindrical shape and comprises a case 11, an electrical terminal 12, a cell 13, an insulating layer 14, a positive electrode current collector 15, a negative electrode current collector 18, a current cut-off device 16, and other structures. Here, the cell 13 is a cylindrical structure composed of a positive electrode plate 131, a negative electrode plate 132 and an interposed separator 133 that are stacked and wound in an arrangement manner shown in FIG. 3, and is filled with an electrolyte solution. It is to be understood that during preparation of the cell 13, a device such as a winding needle is used as an axis of winding. After the winding is completed, the winding needle is withdrawn from the cell 13. Thus, a winding cavity 134 is formed in the cell 13.

After preparation and forming, the cell 13 is arranged in the case 11. The case 11 may be made of a conductive material such as steel, and aluminium. In addition to providing supporting and accommodating functions, the case 11 may also be electrically connected to the negative electrode plate 132 of the cell 13 by means of the negative electrode current collector 18 arranged at a lower end of the cell 13, thereby forming a negative terminal of the battery 10 to be electrically connected to an external device. The positive electrode current collector 15 is mounted at an upper end of the cell 13 and is electrically connected to the positive electrode plate 131. The electrical terminal 12 is electrically connected to the positive electrode current collector 15, forming a positive terminal of the battery 10. In order to avoid an internal short-circuit, the insulating layer 14 is also arranged between the case 11 and the cell 13 and between the case 11 and the electrical terminal 12 for insulating and isolating.

The current cut-off device 16 is connected between the electrical terminal 12 and the positive electrode current collector 15. For example, the current cut-off device 16 may be kept in close contact with the electrical terminal 12 through clamping and squeezing by the case 11 to form an electrical connection, and may be connected to the positive electrode current collector 15 by welding. The current cut-off device 16 isolates an internal space of the battery 10 from an external environment, and the inner side of the current cut-off device is subject to an internal gas pressure of the battery and the outer side to an external ambient pressure. The current cut-off device 16 is provided with a weakened portion between the part connected to the positive electrode current collector 15 and the part connected to the electrical terminal 12. When a voltage and/or internal temperature of the battery 10 rises to or even exceeds a safety threshold value due to, for example, overcharging, an increased gas pressure may be produced inside the battery, forming a great pressure difference between the inner and outer sides of the current cut-off device 16. When the pressure difference exceeds a structural strength of the weakened portion, the weakened portion is broken to cut off the electrical connection between the electrical terminal 12 and the positive electrode current collector 15, forming a break of circuit to prevent the temperature of the battery 10 from continuing to rise.

Figure 4:
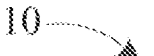
FIG. 4 is a sectional view taken along line A-A in FIG. 1, where a safety device is shown.
Figure 4:
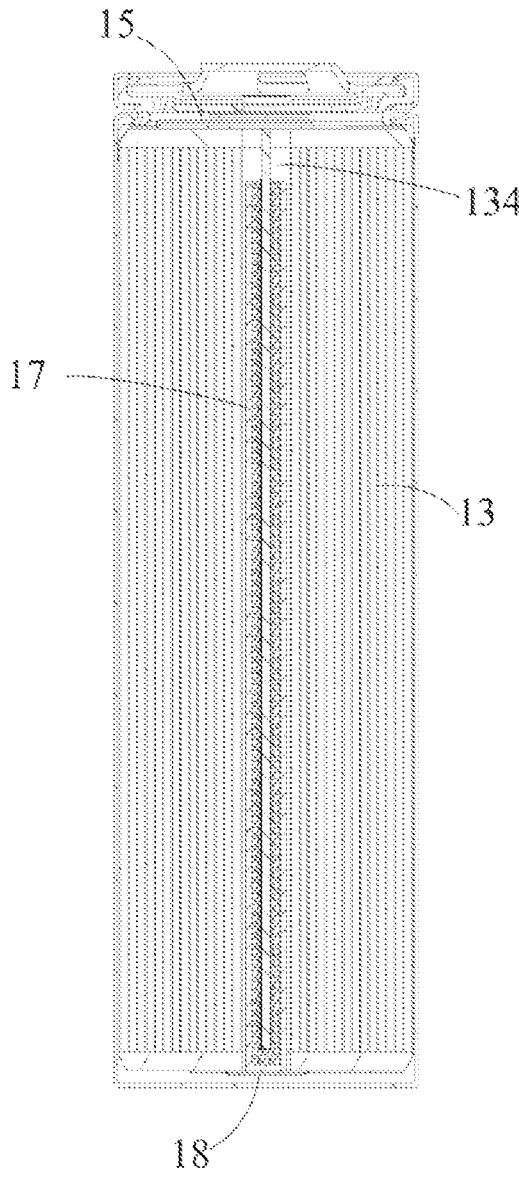
Figure 5:
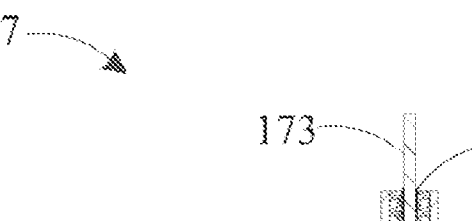
FIG. 5 is a vertical sectional view of the safety device of the battery shown in FIG. 1.
Figure 5:
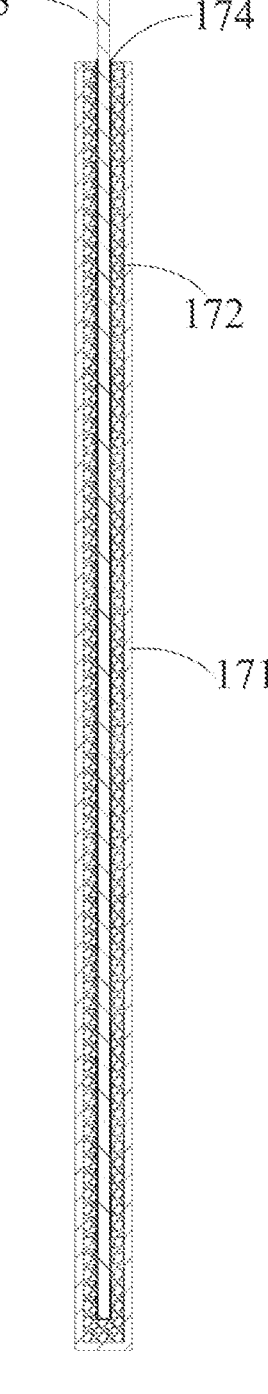

In response to the increased gas pressure produced in the battery 10 due to overcharging thereof, as shown in FIGS. 4 and 5, the battery 10 further comprises a safety device 17 having a first electrode 171 and a second electrode 173. The first electrode 171 is electrically connected to one of the positive electrode and the negative electrode of the battery 10, the second electrode 173 is electrically connected to the other one, and the first electrode and the second electrode are arranged spaced apart from each other. In this way, an electric field may be generated between the first electrode 171 and the second electrode 173. In other words, the first electrode 171 and the second electrode 173 form a structure similar to a capacitor. Further, the safety device 17 also comprises a gas generating material 172 arranged in the electric field formed between the first electrode 171 and the second electrode 173 and capable of generating an inert gas in response to that the voltage in the electric field rises to or exceeds a predetermined value.

Herein, the overcharging of the battery 10 may be understood as the battery 10 being charged at a constant current to the extent that its voltage exceeds a predetermined voltage value for a predetermined duration. A test standard for a battery used in a power tool is taken as an example: the battery is generally charged to 6 V to 7.5 V using a constant current of 2C and is kept at that voltage for 30 min after the voltage reaches a cut-off voltage. The battery is then in an overcharged state.

It is to be understood that as the first electrode 171 and second electrode 173 are respectively electrically connected to the positive electrode or the negative electrode of the battery 10, the voltage of the electric field between the two is the voltage of the battery 10. When the battery 10 is overcharged, the gas generating material 172 of the safety device 17 is also in an electric field environment with an excessive voltage, and generates an inert gas in response to this excessive voltage, resulting in an increase in the internal gas pressure of the battery 10, leading to an increase in the pressure difference between the inner and outer sides of the current cut-off device 16. Further, when the pressure difference is increased beyond the structural strength of the weakened portion of the current cut-off device 16, its structure is destroyed, eventually leading to an internal break of circuit of the battery 10.

Preferably, the safety device 17 is configured as an elongated structure and accordingly may be arranged in the winding cavity 134 of the cell 13, so that the internal space of the battery 10 can be used fully, making the battery compact in structure and avoiding an increase in size. Referring to FIGS. 4 and 5, the first electrode 171 is configured as a cylindrical structure, the bottom of which is electrically connected to the negative electrode current collector 18 at the lower end of the cell 13. For example, the two may be directly and fixedly connected together by welding. The gas generating material 172 is filled inside the cylindrical structure. The second electrode 173 is configured as a needle-like structure such as an elongated rod or needle, which may be fixedly connected to the positive electrode current collector 15 by welding, so as to be electrically connected to the positive electrode of the battery 10. The cylindrical structure is open towards an end portion of the second electrode 173. The second electrode 173 is inserted into the cylindrical structure in an axial direction of the cylindrical structure and is partially buried in the gas generating material 172. In this way, the first electrode 171 and the second electrode 173 form a structure similar to a cylindrical capacitor, and the gas generating material 172 is arranged in the electric field between the first electrode and the second electrode. Preferably, the first electrode 171 and the second electrode 173 are coaxially arranged such that the voltage in the electric field is evenly distributed, and the voltage of the battery 10 can thus be reflected more accurately.

The first electrode 171 and the second electrode 173 may be made of a corrosion-resistant metal material such as stainless steel. The cylindrical structure for forming the first electrode 171 may have a diameter of 2 mm to 3 mm, a length of 5 mm or more, preferably greater than 8 mm, and a thickness of about 300 μm to 500 μm. The diameter and the length of the needle-like structure for forming the second electrode 173 may be designed to be suitable for being connected to the positive electrode current collector 15 while being arranged in the cylindrical structure. As described above, in the illustrated embodiment, the end portion of the cylindrical structure facing towards the second electrode 173 is provided with an opening, which, in addition to facilitating the insertion of the second electrode 173 and facilitating filling the cylindrical structure with the gas generating material 172, may facilitate the escape of the gas generated by the gas generating material 172. It is to be understood that in other embodiments, the opening of the cylindrical structure may also be provided in another position, for example on the side, and that more than one opening may be provided.

Preferably, the gas generating material 172 may comprise particles of an inorganic material, and the gas produced may be an inert gas that does not participate in combustion itself and cannot support combustion. The inert gas is inherently present in nature, which is non-toxic, non-hazardous, and safer. Moreover, the inert gas can use the pressure difference with the external environment to destroy the structure of the current cut-off device 16 to form a break of circuit, and can also reduce a concentration of oxygen inside the battery 10 and a rate of oxidation reaction, to alleviate the problem of heat accumulation and thermal runaway caused by the oxidation reaction still existing in the cell 13 after the battery 10 is subjected to a break of circuit, thereby inhibiting further temperature rise of the cell 13, and reducing the risk of combustion or explosion of the battery 10. The particles of the inorganic material may be, for example, lithium carbonate particles, which can be decomposed in response to a high voltage and/or high temperature to produce carbon dioxide. Preferably, in order to increase the response speed and gas generation rate of the particles of the inorganic material, the particle size of the particles may be set to the micron level, for example, 10 μm to 20 μm. The gas generating material 172 may have a mass of 10 mg to 200 mg depending on the different size of space in the cell 13.

Further, in order to enable the particles of the inorganic material in the gas generating material 172 to react simultaneously to produce an inert gas, particles of a material capable of conducting electricity and heat, such as carbon black, may be doped therein to improve the electrical conductivity and thermal conductivity within the particles of the inorganic material, so that the voltage and the temperature can be uniformly distributed in the gas generating material 172. Preferably, in order to avoid a short circuit, at least the part of the second electrode 173 in contact with the gas generating material 172 is provided with an insulating layer 174.

The embodiments illustrated in the accompanying drawings have been described above. It is to be understood that in some further alternative embodiments, the specific structure and the arrangement of the safety device may be varied without departing from the inventive concept of the present application. For example, the safety device is not necessarily an elongated structure, but may be configured as a plate-shaped structure similar to a plate capacitor, and may be arranged at other locations in the internal space of the battery outside the winding cavity of the cell, as long as the internal space of the battery is allowable.

According to the technical solution of the present invention, as the overcharge additive is concentrated in the safety device, the amount of overcharge additive that reacts when the battery is overcharged can be increased, the gas generation rate can be increased, and the gas may escape directly into an internal space of the battery, thereby saving time for migration from the cell and increasing the reaction rate. In addition, as there is no need to disperse the overcharge additive in the electrode plates of the cell by means of doping, the energy density and the power density of electrode plates are increased, while the risk of introducing metallic foreign bodies can be reduced, with less negative impact on the design and the electrochemical performance of the cell. In one embodiment, the positive electrode plate of the cell is not doped with lithium carbonate.

The foregoing description of the multiple embodiments of the present invention is provided for descriptive purposes to a person of ordinary skill in the related art. It is not intended to exclude or limit the present invention to a single disclosed embodiment. As described above, various substitutions and variations of the present invention will be apparent to those of ordinary skill in the art. Therefore, while some alternative embodiments are specifically described, other embodiments will be apparent or relatively readily developed by those of ordinary skill in the art. The present invention is intended to include all substitutions, modifications and variations of the present invention as described herein, and the other embodiments that fall within the spirit and scope of the present invention as described above.

What is claimed is:

1. A battery, comprising:
a case;
a cell, the cell being packaged in the case;
an electrical terminal, the electrical terminal being located at one end of the case and electrically connected to the cell;
a safety device, the safety device comprising:
a first electrode, wherein the first electrode is electrically connected to one of a positive electrode and a negative electrode of the cell, wherein the first electrode is configured as a cylinder;
a second electrode, wherein the second electrode is electrically connected to the other one of the positive electrode and the negative electrode, wherein the second electrode is configured as a needle-like structure which extends at least partially into the cylinder in an axial direction of the cylinder, the first electrode and the second electrode are arranged spaced apart from each other, and an electric field is formed between the first electrode and the second electrode;
a gas generating material, wherein the gas generating material is provided in the electric field and capable of generating an inert gas when a voltage in the electric field reaches or exceeds a predetermined threshold value, wherein the gas generating material is doped with conductive particles; and
a current cut-off device, the current cut-off device being electrically connected between the cell and the electrical terminal and capable of causing a brake of circuit in response to a pressure difference between an inside of the battery and an external environment caused by the inert gas generated by the safety device.

2. The battery according to claim 1, wherein the battery is a lithium-ion battery, the cell is composed of a positive electrode plate, a separator and a negative electrode plate that are stacked and wound, and has an internal winding cavity, the safety device is configured to have an elongated shape and arranged in the winding cavity, and preferably, the positive electrode plate is not doped with lithium carbonate.

3. The battery according to claim 2, wherein the first electrode is configured to be filled with the gas generating material, and the second electrode is configured to be buried in the gas generating material within the first electrode.

4. The battery according to claim 3, wherein at least a part of the needle-like structure that is in contact with the gas generating material is provided with an insulating layer.

5. The battery according to claim 4, wherein the conductive particles are carbon black.

6. The battery according to claim 3, wherein the cylinder is provided with at least one opening through which an internal space of the cylinder is capable of communicating with the winding cavity.

7. The battery according to claim 6, wherein at least one of the at least one opening is provided at an end portion of the cylinder that faces towards the needle-like structure.

8. The battery according to claim 1, wherein the first electrode and the second electrode are made of a corrosion-resistant metal material, and preferably of stainless steel.

9. The battery according to claim 1, wherein the gas generating material comprises particles of an inorganic material that have a micron-order size, the inorganic material preferably comprises lithium carbonate, and the size is preferably 10 μm to 20 μm.

10. The battery according to claim 9, wherein the gas generating material has a mass of 10 mg to 200 mg.

* * * * *